US006606343B2

(12) United States Patent
Zeira et al.

(10) Patent No.: US 6,606,343 B2
(45) Date of Patent: *Aug. 12, 2003

(54) OUTER LOOP/WEIGHTED OPEN-LOOP POWER CONTROL APPARATUS FOR A BASE STATION

(75) Inventors: Ariela Zeira, Trumball, CT (US); Sung-Hyuk Shin, Fort Lee, NJ (US); Steven G. Dick, Nesconset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/080,759

(22) Filed: Feb. 22, 2002

(65) Prior Publication Data

US 2002/0075939 A1 Jun. 20, 2002

Related U.S. Application Data

(63) Continuation of application No. 09/533,423, filed on Mar. 22, 2000.

(51) Int. Cl.[7] ................................................. H04B 1/69
(52) U.S. Cl. ...................... 375/130; 455/522; 370/342
(58) Field of Search ................................ 375/130, 295, 375/140; 370/335, 342; 455/69, 522

(56) References Cited

U.S. PATENT DOCUMENTS

| | | | |
|---|---|---|---|
| 4,868,795 A | 9/1989 | McDavid et al. | |
| 5,056,109 A | 10/1991 | Gilhousen et al. | 375/370 |
| 5,542,111 A | 7/1996 | Ivanov et al. | |
| 5,839,056 A | 11/1998 | Hakkinen | |
| 5,859,838 A | 1/1999 | Soliman | |
| 6,101,179 A | 8/2000 | Soliman | |
| 6,108,561 A | 8/2000 | Mallinckrodt | |
| 6,175,586 B1 | 1/2001 | Lomp | |
| 6,175,745 B1 | 1/2001 | Bringby et al. | |
| 6,188,678 B1 | 2/2001 | Prescott | |
| 6,373,823 B1 | 4/2002 | Chen et al. | |
| 6,449,462 B1 | 9/2002 | Gunnarsson et al. | |

FOREIGN PATENT DOCUMENTS

| | | |
|---|---|---|
| EP | 0462952 | 12/1991 |
| EP | 0610030 | 8/1994 |
| EP | 0682419 | 11/1995 |
| EP | 0500689 B1 | 4/1998 |
| WO | 9749197 | 12/1997 |
| WO | 9845962 | 10/1998 |

OTHER PUBLICATIONS

"Specification of Air–Interface for the 3G Mobile System", Version 1.0, ARIB, Jan. 14, 1999.

"Combined Closed–Loop/Open–Loop Power Control Process for Time Division Duplexing", Ariela Zeira, Sung-Hyuk Shin and Fatih Ozluturk, Apr. 1999.

"Performance of Weighted Open Loop Scheme for Uplink Power Control in TDD Mode", Ariela Zeira and Sung–Hyuk Shin, May 1999.

"Text Proposal for S1.24", Ariela Zeira, Sung–Hyuk Shin and Stephen Dick, May 1999.

Primary Examiner—Temesghen Ghebretinsae
(74) Attorney, Agent, or Firm—Volpe and Koenig, P.C.

(57) ABSTRACT

Outer loop/weighted open loop power control apparatus controls transmission power levels in a spread spectrum time division duplex communication base station. The base station receives a communication including a transmitted power level and measures its received power level. Based in part on the measured power level and the transmitted power level, a path loss estimate is determined. A quality of the path loss estimate is also determined. The transmission power level for a communication from the base station is based in part on weighting the path loss estimate in response to the estimate's quality.

4 Claims, 5 Drawing Sheets

OUTER LOOP/WEIGHTED OPEN-LOOP POWER CONTROL APPARATUS FOR A BASE STATION

This application is a continuation of application Ser. No. 09/533,423, filed Mar. 22, 2000; which application is incorporated herein by reference.

BACKGROUND

This invention generally relates to spread spectrum time division duplex (TDD) communication systems. More particularly, the present invention relates to a system and method for controlling transmission power within TDD communication systems.

FIG. 1 depicts a wireless spread spectrum time division duplex (TDD) communication system. The system has a plurality of base stations $30_1$–$30_7$. Each base station $30_1$ communicates with user equipment (UEs) $32_1$–$32_3$ in its operating area. Communications transmitted from a base station $30_1$ to a UE $32_1$ are referred to as downlink communications and communications transmitted from a UE $32_1$ to a base station $30_1$ are referred to as uplink communications.

In addition to communicating over different frequency spectrums, spread spectrum TDD systems carry multiple communications over the same spectrum. The multiple signals are distinguished by their respective chip code sequences (codes). Also, to more efficiently use the spread spectrum, TDD systems as illustrated in FIG. 2 use repeating frames 34 divided into a number of time slots $36_1$–$36_n$, such as sixteen time slots. In such systems, a communication is sent in selected time slots $36_1$–$36_n$ using selected codes. Accordingly, one frame 34 is capable of carrying multiple communications distinguished by both time slot and code. The combination of a single code in a single time slot is referred to as a resource unit. Based on the bandwidth required to support a communication, one or multiple resource units are assigned to that communication.

Most TDD systems adaptively control transmission power levels. In a TDD system, many communications may share the same time slot and spectrum. When a UE $32_1$ or base station $30_1$ is receiving a specific communication, all the other communications using the same time slot and spectrum cause interference to the specific communication. Increasing the transmission power level of one communication degrades the signal quality of all other communications within that time slot and spectrum. However, reducing the transmission power level too far results in undesirable signal to noise ratios (SNRs) and bit error rates (BERs) at the receivers. To maintain both the signal quality of communications and low transmission power levels, transmission power control is used.

One approach using transmission power control in a code division multiple access (CDMA) communication system is described in U.S. Pat. No. 5,056,109 (Gilhousen et al.). A transmitter sends a communication to a particular receiver. Upon reception, the received signal power is measured. The received signal power is compared to a desired received signal power. Based on the comparison, a control bit is sent to the transmitter either increasing or decreasing transmission power by a fixed amount. Since the receiver sends a control signal to the transmitter to control the transmitter's power level, such power control techniques are commonly referred to as closed loop.

Under certain conditions, the performance of closed loop systems degrades. For instance, if communications sent between a UE and a base station are in a highly dynamic environment, such as due to the UE moving, such systems may not be able to adapt fast enough to compensate for the changes. The update rate of closed loop power control in TDD is typically 100 cycles per second which is not sufficient for fast fading channels. Accordingly, there is a need for alternate approaches to maintain signal quality and low transmission power levels.

SUMMARY

Outer loop/weighted open loop power control controls transmission power levels in a spread spectrum time division duplex communication system. At a first communication station, errors are measured in a received communication from a second communication station. Based on in part the measured errors, an adjustment in a target level is determined. The first station transmits a communication and the target adjustment to the second station. The second station measures the first station's communication's received power level. Based on in part the received power level, a path loss is determined. The target level is adjusted in response to receiving the target adjustment. The quality of the path loss is determined with respect to a subsequent communication to be transmitted from the second station. The second station's transmission power level for the subsequent communication is adjusted based on in part the determined path loss, the determined quality and the adjusted target level.

DETAILED DESCRIPTION OF THE PREFERRED EMBODIMENTS

Figure 1:
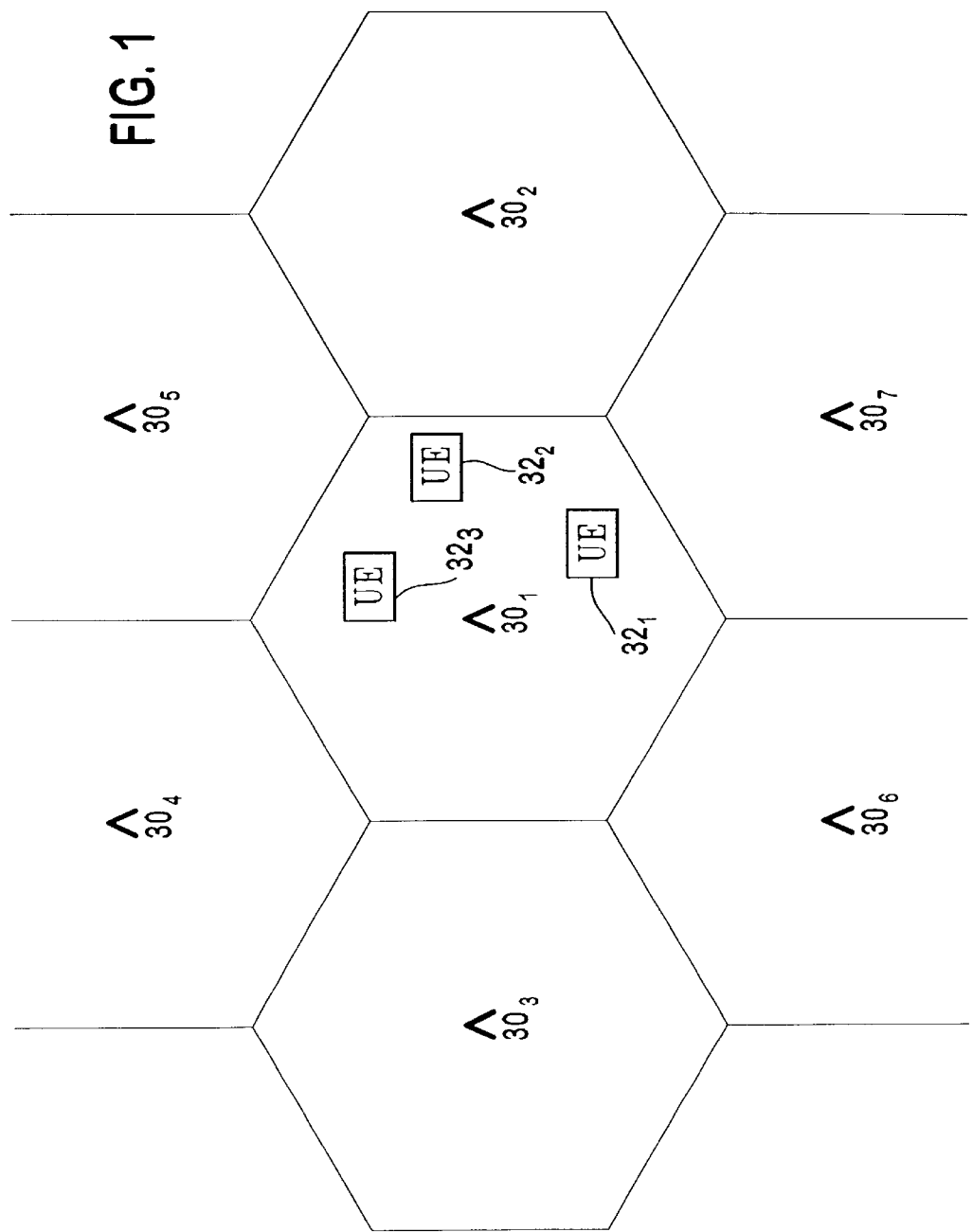
FIG. 1 illustrates a prior art TDD system.
Figure 2:
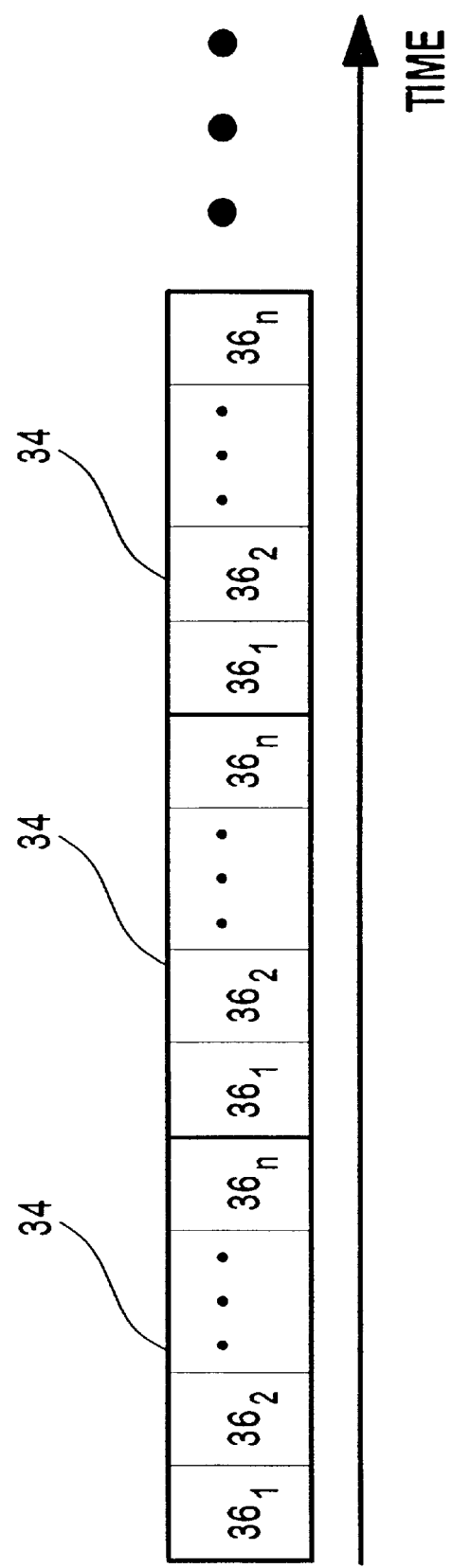
FIG. 2 illustrates time slots in repeating frames of a TDD system.
Figure 3:
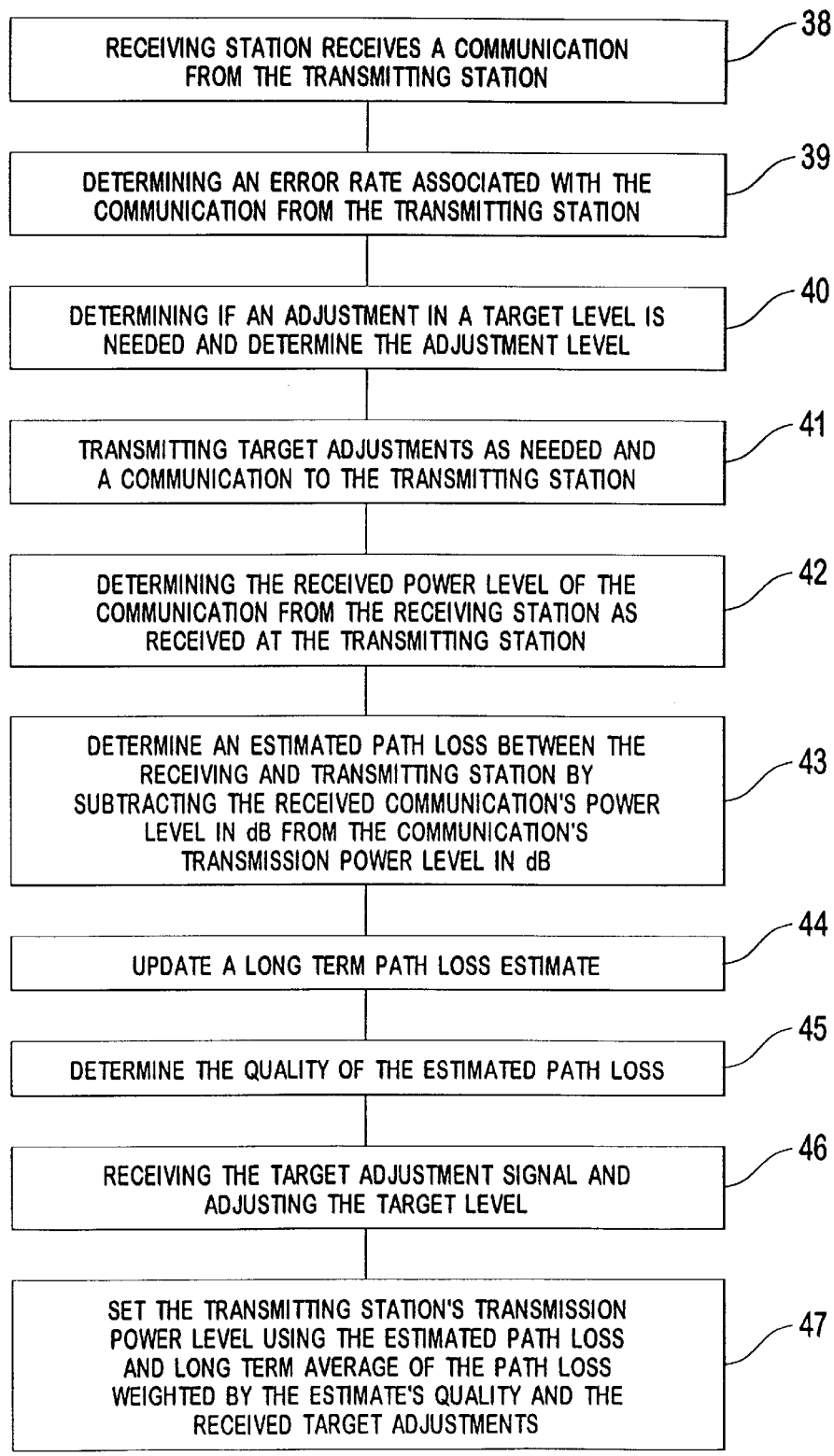
FIG. 3 is a flow chart of outer loop/weighted open loop power control.
Figure 4:
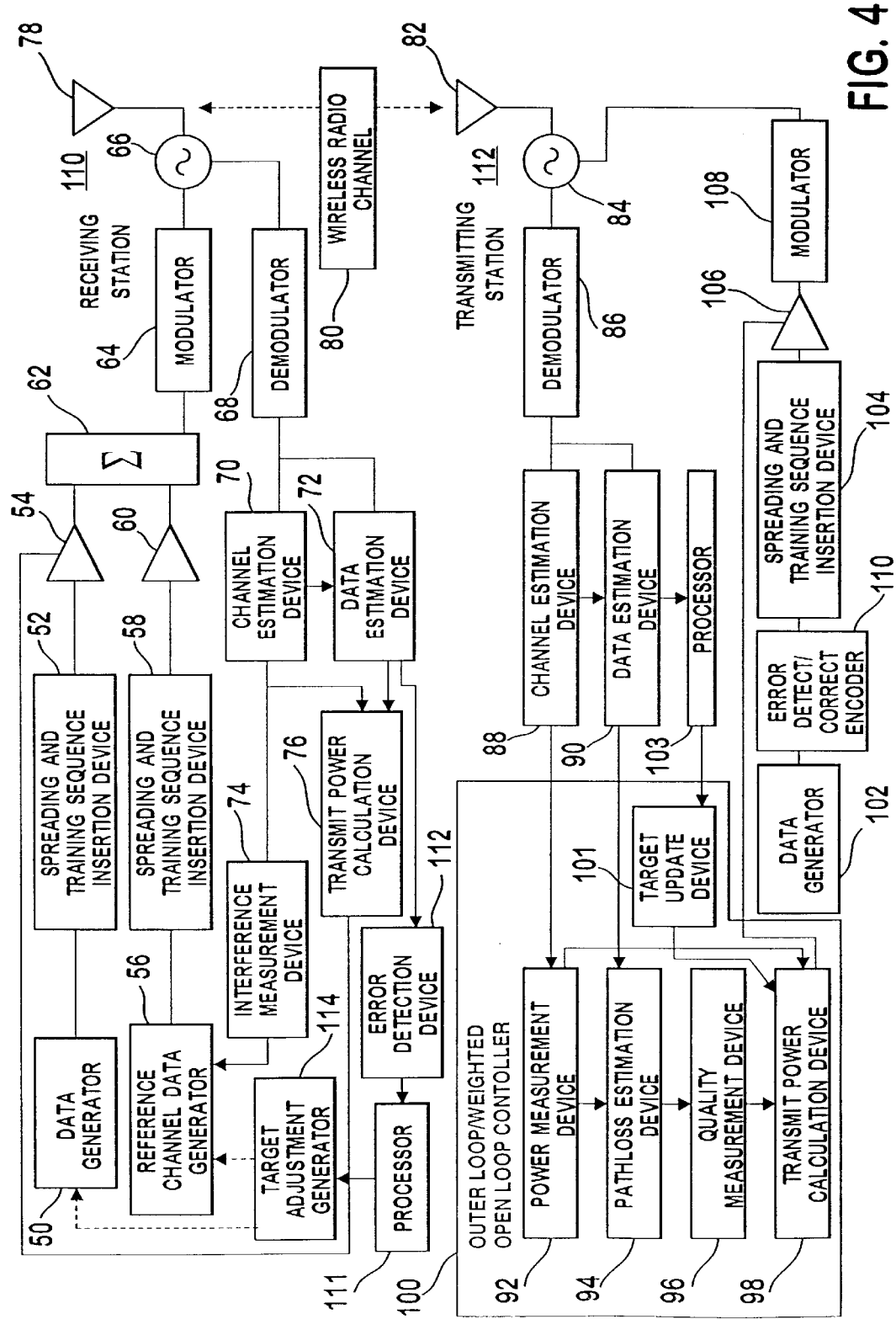
FIG. 4 is a diagram of components of two communication stations using outer loop/weighted open loop power control.

The preferred embodiments will be described with reference to the drawing figures where like numerals represent like elements throughout. Outer loop/weighted open loop power control will be explained using the flow chart of FIG. 3 and the components of two simplified communication stations 110, 112 as shown in FIG. 4. For the following discussion, the communication station having its transmitter's power controlled is referred to as the transmitting station 112 and the communication station receiving power controlled communications is referred to as the receiving station 110. Since outer loop/weighted open loop power control may be used for uplink, downlink or both types of communications, the transmitter having its power controlled may be associated with the base station $30_1$, UE $32_1$ or both. Accordingly, if both uplink and downlink power control are used, the receiving and transmitting station's components are associated with both the base station $30_1$ and UE $32_1$.

The receiving station 110 receives various radio frequency signals including communications from the transmitting station 112 using an antenna 78, or alternately, an antenna array, step 38. The received signals are passed thorough an isolator 66 to a demodulator 68 to produce a baseband signal. The baseband signal is processed, such as by a channel estimation device 70 and a data estimation device 72, in the time slots and with the appropriate codes assigned to the transmitting station's communication. The channel estimation device 70 commonly uses the training sequence component in the baseband signal to provide channel information, such as channel impulse responses. The channel information is used by the data estimation device 72, the interference measurement device 74, and the transmit power calculation device 76. The data estimation device 72 recovers data from the channel by estimating soft symbols using the channel information.

Prior to transmission of the communication from the transmitting station 112, the data signal of the communication is error encoded using an error detection/correction encoder 110. The error encoding scheme is typically a circular redundancy code (CRC) followed by a forward error correction encoding, although other types of error encoding schemes may be used.

Using the soft symbols produced by the data estimation device 72, an error detection device 112 detects errors in the soft symbols. A processor 111 analyzes the detected error and determines an error rate for the received communication, step 39. Based on the error rate, the processor 111 determines the amount, if any, a target level, such as a target signal to interference ration ($SIR_{TARGET}$), needs to be changed at the transmitting station 112, step 40. Based on the determined amount, a target adjustment signal is generated by the target adjustment generator 114. The target adjustment is subsequently sent to the transmitting station, step 41. The target adjustment is signaled to the transmitting station 112, such as using a dedicated or a reference channel as shown in FIG. 4, step 41.

One technique to determine the amount of adjustment in the target level uses an upper and lower threshold. If the determined error rate exceeds an upper threshold, the target level is set at an unacceptably low level and needs to be increased. A target level adjustment signal is sent indicating an increase in the target level. If the determined error rate is below a second threshold, the target level is set at an unnecessarily high level and the target level can be decreased. By reducing the target level, the transmitting station's power level is decreased reducing interference to other communications using the same time slot and spectrum. To improve performance, as soon as the error rate exceeds the upper limit, a target adjustment is sent. As a result, high error rates are improved quickly and lower error rates are adjusted slowly, such as once per 10 seconds. If the error rate is between the thresholds, a target adjustment is not sent maintaining the same target level.

Applying the above technique to a system using CRC and FEC encoding follows. Each CRC block is checked for an error. Each time a frame is determined to have an error, a counter is incremented. As soon as the counter exceeds an upper threshold, such as 1.5 to 2 times the desired block error rate (BLER), a target adjustment is sent increasing the target level. To adjust the $SIR_{TARGET}$ at the transmitting station 112, the increase in the $SIR_{TARGET}$ is sent ($SIR_{INC}$), which is typically in a range of 0.25 dB to 4 dB. If the number of CRC frames encountered exceeds a predetermined limit, such as 1000 blocks, the value of the counter is compared to a lower threshold, such as 0.2 to 0.6 times the desired BLER. If the number of counted block errors is below the lower threshold, a target adjustment signal is sent decreasing the target level, $SIR_{DEC}$. A typical range of $SIR_{DEC}$ is 0.25 to 4 dB. The value of $SIR_{DEC}$ may be based on $SIR_{INC}$ and a target block error rate, $BLER_{TARGET}$. The $BLER_{TARGET}$ is based on the type of service. A typical range for the $BLER_{TARGET}$ is 0.1% to 10%. Equation 1 illustrates one such approach for determining $SIR_{DEC}$.

$$SIR_{DEC}=SIR_{INC} \times BLER_{TARGET}/(1-BLER_{TARGET}) \qquad \text{Equation 1}$$

If the count is between the thresholds for the predetermined block limit, a target adjustment signal is not sent.

Alternately, a single threshold may be used. If the error rate exceeds the threshold, the target level is increased. If the error rate is below the threshold, the target is decreased. Additionally, the target level adjustment signal may have several adjustment levels, such as from 0 dB to ±4 dB in 0.25 dB increments based on the difference between the determined error rate and the desired error rate.

The interference measurement device 74 of the receiving station 110 determines the interference level in dB, $I_{RS}$, within the channel, based on either the channel information, or the soft symbols generated by the data estimation device 72, or both. Using the soft symbols and channel information, the transmit power calculation device 76 controls the receiving station's transmission power level by controlling the gain of an amplifier 54.

For use in estimating the pathloss between the receiving and transmitting stations 110, 112 and sending data, the receiving station 110 sends a communication to the transmitting station 112, step 41. The communication may be sent on any one of the various channels. Typically, in a TDD system, the channels used for estimating pathloss are referred to as reference channels, although other channels may be used. If the receiving station 110 is a base station 30₁, the communication is preferably sent over a downlink common channel or a common control physical channel (CCPCH). Data to be communicated to the transmitting station 112 over the reference channel is referred to as reference channel data. The reference data may include, as shown, the interference level, $I_{RS}$, multiplexed with other reference data, such as the transmission power level, $T_{RS}$. The interference level, $I_{RS}$, and reference channel power level, $I_{RS}$, may be sent in other channels, such as a signaling channel.

The reference channel data is generated by a reference channel data generator 56. The reference data is assigned one or multiple resource units based on the communication's bandwidth requirements. A spreading and training sequence insertion device 58 spreads the reference channel data and makes the spread reference data time-multiplexed with a training sequence in the appropriate time slots and codes of the assigned resource units. The resulting sequence is referred to as a communication burst. The communication burst is subsequently amplified by an amplifier 60. The amplified communication burst may be summed by a sum device 62 with any other communication burst created through devices, such as a data generator 50, spreading and training sequence insertion device 52 and amplifier 54.

The summed communication bursts are modulated by a modulator 64. The modulated signal is passed thorough an isolator 66 and radiated by an antenna 78 as shown or, alternately, through an antenna array. The radiated signal is passed through a wireless radio channel 80 to an antenna 82 of the transmitting station 112. The type of modulation used for the transmitted communication can be any of those known to those skilled in the art, such as direct phase shift keying (DPSK) or quadrature phase shift keying (QPSK).

The antenna 82 or, alternately, antenna array of the transmitting station 112 receives various radio frequency signals including the target adjustments. The received signals are passed through an isolator 84 to a demodulator 86 to produce a baseband signal. The baseband signal is processed, such as by a channel estimation device 88 and a data estimation device 90, in the time slots and with the appropriate codes assigned to the communication burst of the receiving station 110. The channel estimation device 88 commonly uses the training sequence component in the baseband signal to provide channel information, such as channel impulse responses. The channel information is used by the data estimation device 90 and a power measurement device 92.

The power level of the processed communication corresponding to the reference channel, $R_{TS}$, is measured by the power measurement device 92 and sent to a pathloss estimation device 94, step 42. Both the channel estimation device 88 and the data estimation device 90 are capable of separating the reference channel from all other channels. If an automatic gain control device or amplifier is used for processing the received signals, the measured power level is adjusted to correct for the gain of these devices at either the power measurement device 92 or pathloss estimation device 94. The power measurement device is a component of an outer loop/weighted open loop controller 100. As shown in FIG. 4, the outer loop/weighted open loop controller 100 comprises the power measurement device 92, pathloss estimation device 94, quality measurement device 94, target update device 101, and transmit power calculation device 98.

To determine the path loss, L, the transmitting station 112 also requires the communication's transmitted power level, $T_{RS}$. The communication's transmitted power level, $T_{RS}$, may be sent along with the communication's data or in a signaling channel. If the power level, $T_{RS}$, is sent along with the communication's data, the data estimation device 90 interprets the power level and sends the interpreted power level to the pathloss estimation device 94. If the receiving station 110 is a base station $30_1$, preferably the transmitted power level, $T_{RS}$, is sent via the broadcast channel (BCH) from the base station $30_1$. By subtracting the received communication's power level, $R_{TS}$, from the sent communication's transmitted power level, $T_{RS}$, the pathloss estimation device 94 estimates the path loss, L, between the two stations 110, 112, step 43. Additionally, a long term average of the pathloss, $L_0$, is updated, step 44. The long term average of the pathloss, $L_0$, is an average of the pathloss estimates. In certain situations, instead of transmitting the transmitted power level, $T_{RS}$, the receiving station 110 may transmit a reference for the transmitted power level. In that case, the pathloss estimation device 94 provides reference levels for the pathloss, L.

Since TDD systems transmit downlink and uplink communications in the same frequency spectrum, the conditions these communications experience are similar. This phenomenon is referred to as reciprocity. Due to reciprocity, the path loss experienced for the downlink will also be experienced for the uplink and vice versa. By adding the estimated path loss to a target level, a transmission power level for a communication from the transmitting station 112 to the receiving station 110 is determined.

If a time delay exists between the estimated path loss and the transmitted communication, the path loss experienced by the transmitted communication may differ from the calculated loss. In TDD where communications are sent in differing time slots $36_1$–$36_n$, the time slot delay between received and transmitted communications may degrade the performance of an open loop power control system. To overcome these drawbacks, weighted open loop power control determines the quality of the estimated path loss using a quality measurement device 96, step 45, and weights the estimated path loss accordingly, L, and long term average of the pathloss, $L_0$.

To enhance performance further in outer loop/weighted open loop, a target level is adjusted. A processor 103 converts the soft symbols produced by the data estimation device 90 to bits and extracts the target adjustment information, such as a $SIR_{TARGET}$ adjustment. A target update device 101 adjusts the target level using the target adjustments, step 46. The target level may be a $SIR_{TARGET}$ or a target received power level at the receiving station 110.

The transmit power calculation device 98 combines the adjusted target level with the weighted path loss estimate, L, and long term average of the pathloss estimate, $L_0$, to determine the transmission power level of the transmitting station, step 47.

Data to be transmitted in a communication from the transmitting station 112 is produced by data generator 102. The data is error detection/correction encoded by error detection/correction encoder 110. The error encoded data is spread and time-multiplexed with a training sequence by the training sequence insertion device 104 in the appropriate time slots and codes of the assigned resource units producing a communication burst. The spread signal is amplified by an amplifier 106 and modulated by modulator 108 to radio frequency. The gain of the amplifier is controlled by the transmit power calculation device 98 to achieve the determined transmission power level. The power controlled communication burst is passed through the isolator 84 and radiated by the antenna 82.

The following is one outer loop/weighted open loop power control algorithm. The transmitting stations's transmission power level in decibels, $P_{TS}$, is determined using Equation 2.

$$P_{TS} = SIR_{TARGET} + I_{RS} + \alpha(L-L_0) + L_0 + \text{CONSTANT VALUE} \quad \text{Equation 2}$$

The $SIR_{TARGET}$ has an adjusted value based on the received target adjustment signals. For the downlink, the initial value of $SIR_{TARGET}$ is known at the transmitting station 112. For uplink power control, $SIR_{TARGET}$ is signaled from the receiving station 110 to the transmitting station 112. Additionally, a maximum and minimum value for an adjusted $SIR_{TARGET}$ may also be signaled. The adjusted $SIR_{TARGET}$ is limited to the maximum and minimum values. $I_{RS}$ is the measure of the interference power level at the receiving station 110.

L is the path loss estimate in decibels, $T_{RS} - R_{TS}$, for the most recent time slot $36_1$–$36_n$, that the path loss was estimated. $L_0$, the long term average of the path loss in decibels, is the running average of the pathloss estimate, L. The CONSTANT VALUE is a correction term. The CONSTANT VALUE corrects for differences in the uplink and downlink channels, such as to compensate for differences in uplink and downlink gain. Additionally, the CONSTANT VALUE may provide correction if the transmit power reference level of the receiving station is transmitted, instead of the actual transmit power, $T_{RS}$. If the receiving station 110 is a base station, the CONSTANT VALUE is preferably sent via a Layer 3 message.

The weighting value, α, is a measure of the quality of the estimated path loss and is, preferably, based on the number of time slots $36_1$–$36_n$ between the time slot, n, of the last path loss estimate and the first time slot of the communication transmitted by the transmitting station 112. The value of α is between zero and one. Generally, if the time difference between the time slots is small, the recent path loss estimate will be fairly accurate and α is set at a value close to one. By contrast, if the time difference is large, the path loss estimate may not be accurate and the long term average path loss measurement is most likely a better estimate for the path loss. Accordingly, α is set at a value closer to one.

Equations 3 and 4 are equations for determining α.

$$\alpha = 1-(D-1)/(D_{max}=-1) \quad \text{Equation 3}$$

$$\alpha = \max\{1-(D-1)/(D_{max\text{-}allowed}-1), 0\} \quad \text{Equation 4}$$

The value, D, is the number of time slots $36_1$–$36_n$ between the time slot of the last path loss estimate and the first time slot of the transmitted communication which will be referred to as the time slot delay. If the delay is one time slot, α is one. $D_{max}$ is the maximum possible delay. A typical value for a frame having fifteen time slots is seven. If the delay is $D_{max}$, α is zero $D_{max\text{-}allowed}$ is the maximum allowed time slot delay for using open loop power control. If the delay exceeds $D_{max\text{-}allowed}$, open loop power control is effectively turned off by setting α=0. Using the transmit power level, $P_{TS}$, determined by a transmit power calculation device 98 the transmit power of the transmitted communication is set.

Figure 5:
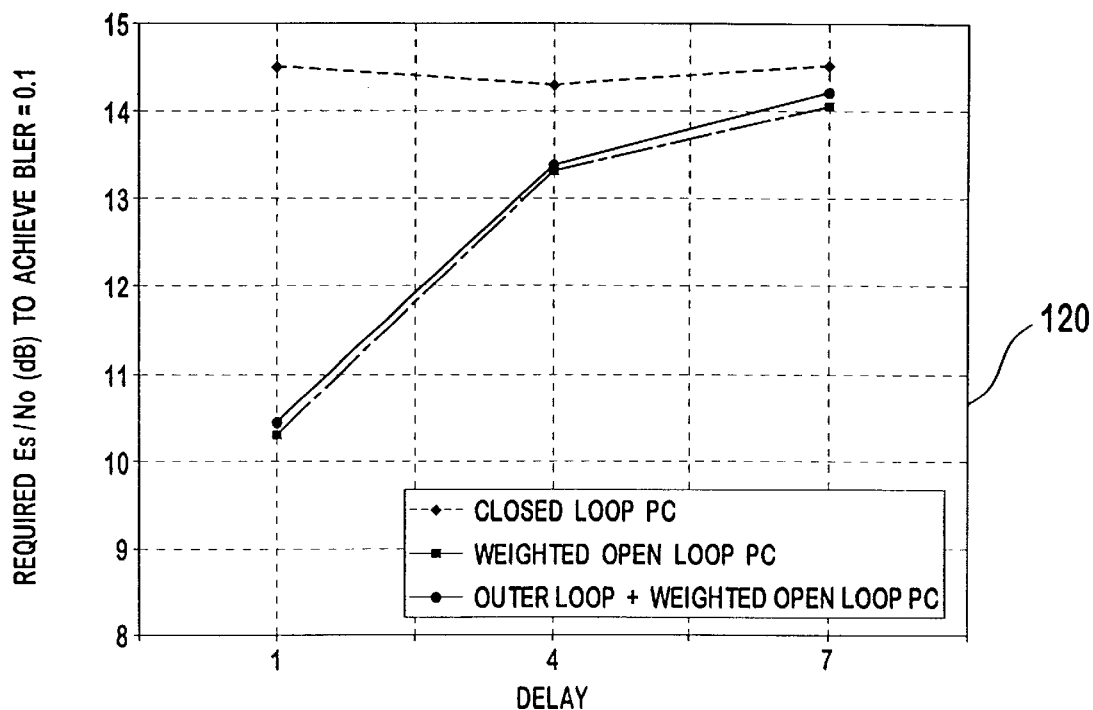
FIG. 5 is a graph of the performance of outer loop/weighted open loop, weighted open loop and closed loop power control systems.
Figure 6:
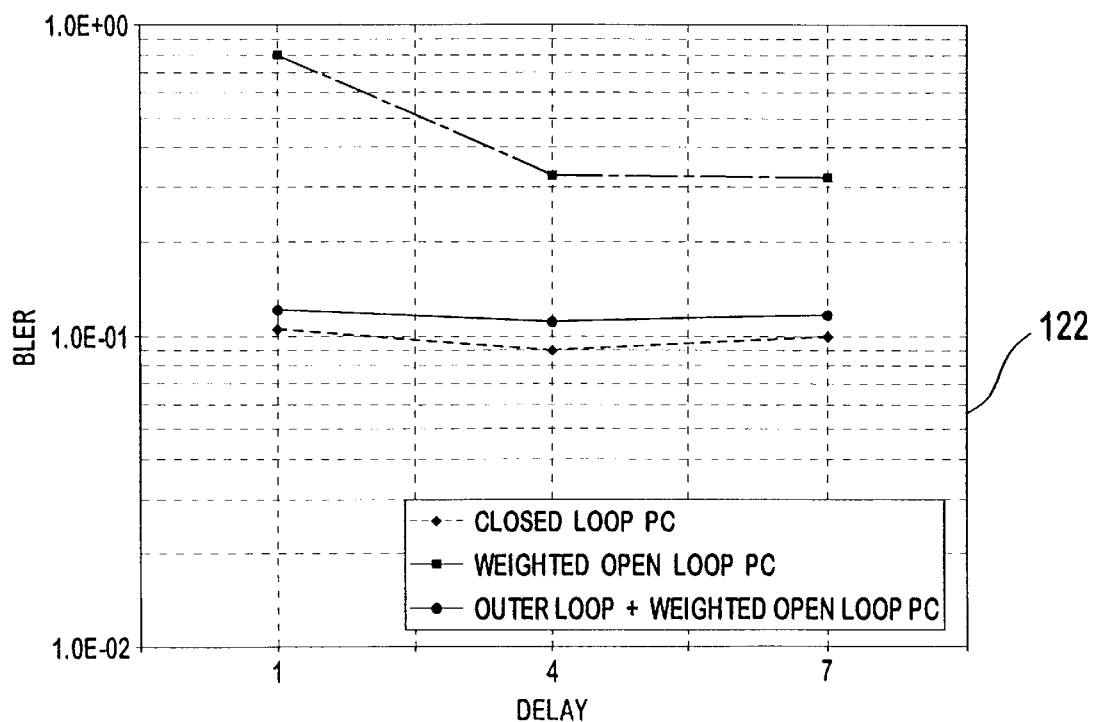
FIG. 6 is a graph of the three systems performance in terms of Block Error Rate (BLER).

FIGS. 5 and 6 compare the performance of the weighted outer loop/open loop, open loop and closed loop systems. The simulations in FIGS. 5 and 6 were performed for a slightly different version of the outer loop/weighted open loop algorithm. In this version, the target SIR is updated every block. A $SIR_{TARGET}$ is increased if a block error was detected and decreased if no block error was detected. The outer loop/weighted open loop system used Equation 2. Equation 3 was used to calculate α. The simulations compared the performance of the systems controlling a UE's $32_1$ transmission power level. For the simulations, 16 CRC bits were padded every block. In the simulation, each block was 4 frames. A block error was declared when at least two raw bit errors occur over a block. The uplink communication channel is assigned one time slot per frame. The target for the block error rate is 10%. The $SIR_{TARGET}$ is updated every 4 frames. The simulations address the performance of these systems for a UE $32_1$ traveling at 30 kilometers per hour. The simulated base station used two antenna diversity for reception with each antenna having a three finger RAKE receiver. The simulation approximated a realistic channel and SIR estimation based on a midamble sequence of burst type 1 field in the presence of additive white Gaussian noise (AWGN). The simulation used an International Telecommunication Union (ITU) Pedestrian B type channel and QPSK modulation. Interference levels were assumed to have no uncertainty. Channel coding schemes were not considered. $L_0$ was set at 0 db.

Graph 120 of FIG. 5 shows the performance as expected in terms of the required $E_S/N_O$ for a BLER of $10^{-1}$ as a function of time delay between the uplink time slot and the most recent downlink time slot. The delay is expressed by the number of time slots. $E_S$ is the energy of the complex symbol. FIG. 5 demonstrates that, when gain/interference uncertainties are ignored, the performance of the combined system is almost identical to that of weighted open loop system. The combined system outperforms the closed loop system for all delays.

In the presence of gain and interference uncertainties, the transmitted power level of the open loop system is either too high or too low of the nominal value. In graph 122 of FIG. 6, a gain uncertainty of –2 dB was used. FIG. 6 shows the BLER as a function of the delay. The initial reference $SIR_{TARGET}$ for each system was set to its corresponding nominal value obtained from FIG. 5, in order to achieve a BLER of $10^{-1}$. FIG. 6 shows that, in the presence of gain uncertainty, both the combined and closed loop systems achieve the desired BLER. The performance of the weighted open loop system severely degrades.

What is claimed is:

1. A base station for use in a spread spectrum time division duplex communication system, using frames with time slots for communication, comprising:

a device for receiving a first communication in a first time slot and transmitting an amplified second communication in a second time slot;

a channel estimation device having an input receiving said first communication for producing channel information;

a data estimation device responsive to said first communication and said channel information for producing interpreted data;

a power measurement device responsive to said channel information for determining a received power level of the first communication;

a path loss estimation device responsive to said measured power level for producing a path loss estimate of the first communication;

a quality measurement device for producing a quality measurement based at least in part upon a time separation of the first time slot and a second time slot;

a transmit power calculation device responsive to said path loss estimate and said quality measurement for producing a power control signal based at least in part upon said path loss estimate weighted by a first factor and a long term path loss estimate weighted by a second factor, wherein the first and second factors are based in part on the quality measurement; and an amplifier receiving the power control signal and a second communication to transmitted in the second time slot for amplifying the second communication responsive to the power control signal to produce the amplified second communication for transmission by said receiving device.

2. The base station of claim 1 further comprising:

a data generator for producing communication data;

a spreading and training sequence insertion device having an input receiving the communication data for producing the second communication in the second time slot; and a modulator having an input receiving the amplified second communication for modulating the amplified second communication to radio frequency prior to transmission.

3. The base station of claim 1 further comprising:

a demodulator having an input receiving the received first communication for producing a baseband signal; and wherein the channel estimation device and the data estimation device each an input receiving the baseband signal.

4. The base station of claim 1 wherein the quality measurement is in the range of zero to one and the first factor is the quality measurement and the second factor is one minus the quality measurement.

* * * * *

UNITED STATES PATENT AND TRADEMARK OFFICE
CERTIFICATE OF CORRECTION

PATENT NO.    : 6,606,343 B2
DATED         : August 12, 2003
INVENTOR(S)   : Zeira et al.

It is certified that error appears in the above-identified patent and that said Letters Patent is hereby corrected as shown below:

<u>Title page,</u>
Item [75], delete "Steven G. Dick", and insert therefor -- Stephen G. Dick --.

Column 7,
Line 8, delete the equation "$\alpha=1-(D-1)/(D_{max}=-1)$", and insert therefor
-- $\alpha=1-(D-1)/(D_{max}-1)$ --.

<u>Column 8,</u>
Line 59, after the word "each", insert the word -- have --.

Signed and Sealed this

Twenty-first Day of October, 2003

JAMES E. ROGAN
*Director of the United States Patent and Trademark Office*